Figure 1:
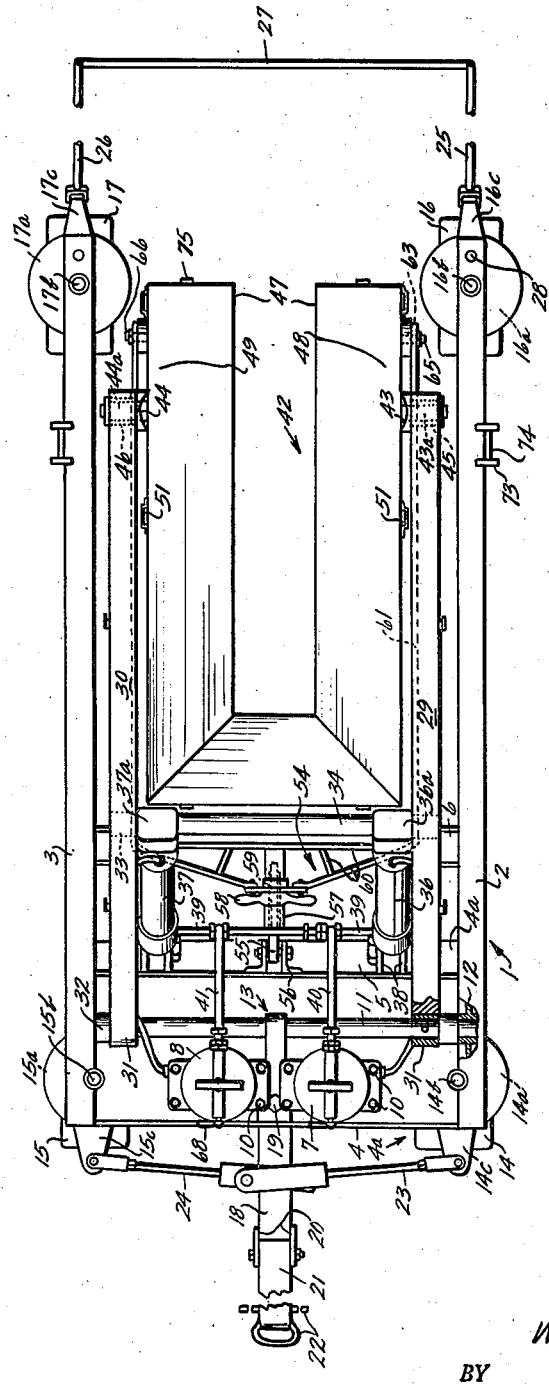

Nov. 30, 1948.  W. W. RYAN  2,454,840
FIGHTER AIRPLANE BOMB LIFT
Filed Oct. 2, 1946  3 Sheets-Sheet 1

INVENTOR.
WARREN W. RYAN
BY
Wade Koontz and
Charles H. Wagner
HIS ATTORNEYS-

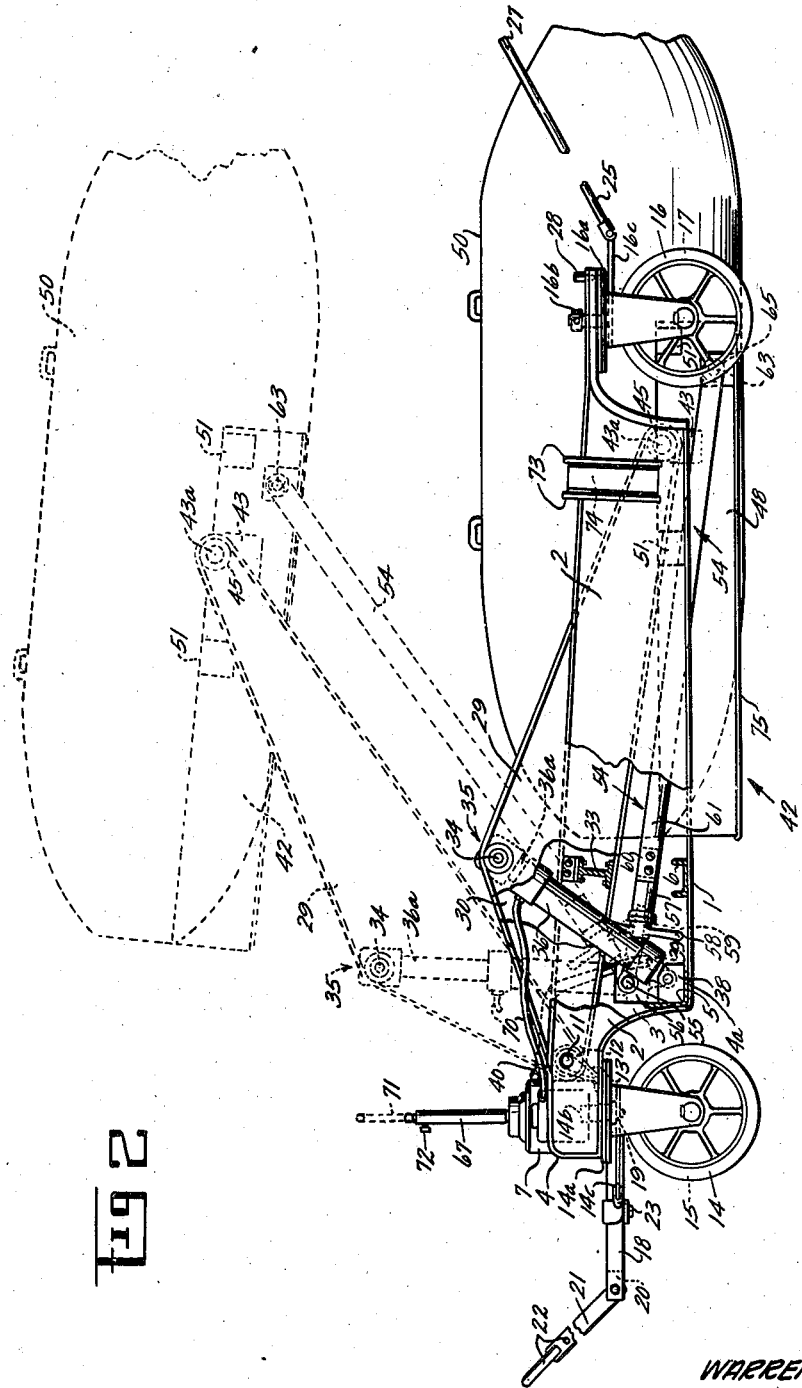

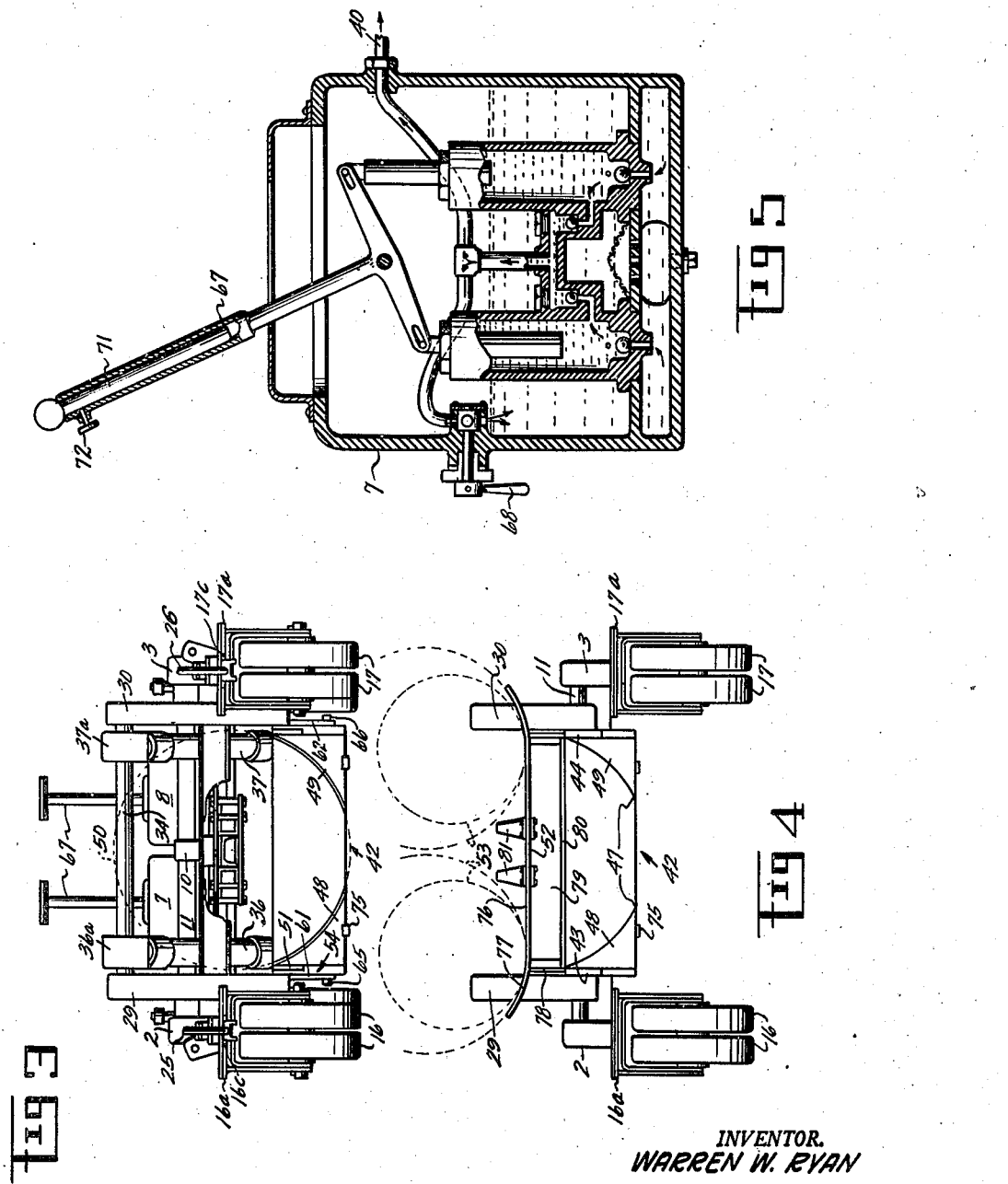

Patented Nov. 30, 1948

2,454,840

UNITED STATES PATENT OFFICE 2,454,840

FIGHTER AIRPLANE BOMB LIFT

Warren W. Ryan, Dayton, Ohio

Application October 2, 1946, Serial No. 700,631

8 Claims. (Cl. 214—130)

(Granted under the act of March 3, 1883, as amended April 30, 1928; 370 O. G. 757)

The invention described herein may be manufactured and used by or for the Government for governmental purposes without payment to me of any royalty thereon.

This invention relates to improvements in bomb transporting, elevating and loading apparatus and more particularly to a combined vehicle truck and bomb handling apparatus for transporting, elevating and positioning aircraft bombs, cylindrical chemical tanks and similar shaped articles, with respect to the supporting means therefor on aircraft to be loaded so that the bombs, chemical tanks and similar objects can be elevated into precise position to be connected directly to the supporting means, and has for one of its objects the provision of adjustable bomb and article supporting and elevating means which is adjustable to a predetermined inclined bomb loading position to agree with substantially any predetermined inclined position of the bomb supporting means of the aircraft that is to be supplied with the bombs.

A further object is the provision of a bomb transporting and loading means having a bomb elevating support capable of directly picking up bombs lying on the ground or other level supporting surface and elevating the same to a predetermined elevation and inclination similar to the elevation and inclination of the bomb supporting means on the bomber or aircraft to be supplied with the bombs so that the bombs can be immediately coupled to the supporting means of the aircraft.

A further object is the provision of a bomb transporting, elevating and loading means for elevating and positioning aircraft bombs in predetermined positions for engagement in the bomb racks of an airplane, including a scoop member capable of being slid under a bomb or chemical tank while resting on the ground and elevated to bring the bomb to a predetermined elevated and inclined position.

A further object is the provision of an improved portable self-contained bomb lifting apparatus including manually operable hydraulic means for elevating bombs and similar objects from a ground supported position to the bomb racks of an airplane, having a bomb elevating scoop member for picking up the bomb or object while resting on the ground and elevating the same to loading position, having hydraulically actuated lifting lever means and associated linkage means for maintaining the scoop member in substantially parallel position throughout its entire elevating movement, with means for adjusting the position of the scoop member during its elevation in substantially parallel relation to the bomb supporting means of the aircraft whereby the bomb may be connected to the bomb supporting means without further tilting adjustment or manipulation of the scoop member.

A further object includes the provision of a plurality of manually operable hydraulic pump devices, connected to a hydraulic lifting ram means for elevating the bomb loading scoop so that the pumps may be operated independently or simultaneously to elevate the bomb lifting scoop member to its bomb loading position, the scoop elevating mechanism including lifting lever means pivoted at one end to the support with the bomb loading scoop pivoted to the lever means at the other end and the hydraulic ram connected at one end to the support, and at the other end to the lifting lever means, with parallel adjustable linkage means connected between the support and the scoop for stabilizing the bomb loading scoop during elevation and lowering thereof to determine the predetermined inclination thereof while in its elevated position.

A further object is the provision of supplemental supporting means between the portable vehicle support and the lever arms of the lifting lever means for supporting the scoop in a predetermined partially elevated position independently of the hydraulic lifting ram elevating means while the vehicle support is being transported over the ground.

Other objects and advantages of the invention will become apparent from the following description taken in connection with the accompanying drawings in which like reference characters refer to like parts in the several figures.

Fig. 1 is a top plan view of my improved bomb lifting, transporting and loading apparatus, illustrating the bomb lifting scoop means in its lowered or bomb receiving position;

Fig. 2 is a side elevation of the apparatus illustrated in Fig. 1, parts being broken away and shown in section, the full lines illustrating the bomb elevating scoop apparatus in its lowered position with conventional aircraft bomb thereon; Dotted lines illustrate the bomb elevating means and the bomb in a predetermined raised and inclined position to agree with an elevated and longitudinally inclined position of conventional bomb racks or bomb supporting means (not shown) of an aircraft to which the bombs are to be connected;

Fig. 3 is a rear or end view of my improved bomb loading apparatus illustrating the bomb elevating scoop in its lowered position with a large bomb positioned thereon, shown in dotted lines, parts being broken away to disclose the configuration of other parts that would otherwise be hidden;

Fig. 4 is a rear view of my apparatus illustrating the bomb lifting scoop in a partially elevated position, and a bomb supporting attachment positioned thereon for supporting two smaller aircraft bombs in parallel side by side relation instead of a single large bomb as seen in Fig. 2; and Fig. 5 is a somewhat diagrammatic sectional view illustrating a somewhat conventional construction of a type of hydraulic pumping mechanism for supplying hydraulic pressure fluid to the hydraulic jack means, and valve means for lowering the scoop.

Referring more particularly to Figs. 1 and 2 of the drawings, my improved portable bomb transporting, elevating and loading apparatus comprises an open-ended truck body or dirigible vehicle support which is indicated generally at 1, having spaced parallel side frame members 2 and 3, rigidly connected together at their forward ends by a cross plate member 4, an angle plate member 5 and a U-shaped channel member 6, the cross plate 4 having a rearwardly extending horizontal portion 4a on which a pair of manually operable hydraulic fluid pumping elements 7 and 8 are secured, bolts 10 being provided, securing these pumping elements 7 and 8 to the horizontal portion 4a of the cross plate member 4.

A shaft 11 extends between the side frame members 2 and 3 with its opposite ends journalled in suitable sockets or bearings 12 that are secured on the inner faces of the side channels. A strap member 13 having its opposite ends secured to the horizontal plate portion 4a is provided, having an intermediate looped portion around the cross shaft 11 at a point midway between the two side frame channels 2 and 3, forming a central bearing for the shaft 11.

Caster or steering wheels 14, 15, 16 and 17 are mounted under the four corners of the truck or vehicle body, each wheel being journalled on one of the horizontal bed plates 14a, 15a, 16a, and 17a for rotation about one of the vertical axes 14b, 15b, 16b and 17b. Each bed plate is formed with one of the horizontally extending steering arms 14c, 15c, 16c and 17c. A towing tongue or steering arm 18 is secured to the underside of the cross plate 4 near the center line of the vehicle on a king pin 19, the arm 18 having a bifurcated end portion 20 in which a vertically swingable towing tongue 21 is horizontally pivoted, a towing ring or suitable towing connection 22 being provided at the outer end of the arm. The towing arm 18 is linked to the two steering arms 14c and 15c of the front wheels of the vehicle by link members 23 and 24 so that as the tongue 18 is swung horizontally, the front wheels of the vehicle can be correspondingly adjusted to steer the truck body. The steering arms 16c and 17c of the rear vehicle wheels 16—17 are connected together, horizontally pivoted steering tongue members 25 and 26 being provided with their free ends connected together by a cross link member 27 so that manipulation of the cross link member 27 adjusts the rear wheels, permitting the rear end of the vehicle to be steered as well as the front end. The base plates 16a and 17a of the rear wheels 16 and 17 are each provided with a vertical locking pin 28, removably disposed in interlocking relation with a suitable hole in the rear wheel bolster plates of the vehicle to lock the rear wheels in parallel relation to the longitudinal axis of the vehicle.

A pair of laterally spaced triangularly shaped lifting levers 29 and 30 are connected at 31 to the cross shaft 11, spacing collars 32 being disposed on the cross shaft between the vehicle side frame members 2 and 3 and the triangular shaped lifting levers 29 and 30. The lifting levers or arms 29 and 30 are of I-beam cross section, having an H-shaped cross channel member 33 rigidly connected at its opposite ends to the lower edges of the lifting levers. A lifting shaft or bar member 34 extends between the lifting levers 29 and 30, connecting the two lifting levers together at their upper edges or apex portions 35, forming a rigid lifting lever frame unit.

A pair of spaced, side by side interconnected hydraulic ram members or lifting cylinders 36 and 37 are pivoted at their lower ends between vertical brackets or ears 38, secured to the upper side of the angle plate 5, the upper ends of the ram member are pistons 36a, 37a, and these pistons are connected to the cross shaft member 34 of the lifting lever frame. A fluid pressure supply conduit 39 connects the interior of the two hydraulic ram cylinders 36—37 together below the extensible ram members or pistons for forcing the upper extremities of the rams or pistons 36a, 37a uniformly outwardly when pressure is supplied to the conduit 39, to swing the free ends of the lifting arms 29 and 30 upwardly about the axis of the shaft 11. Pressure fluid is supplied to the conduit 39 adjacent each ram member through the flexible supply conduit members 40 and 41 connected to the hydraulic pumps 7 and 8, conventional check valves, fluid pressure release valves, etc., being provided as well known in the art to relieve the pumped and holding pressures so that the lifting arms 29 and 30 may be lowered. Figure 5 illustrates a type of hydraulic pressure supply unit that may be used for supplying the pressure fluid to the lifting rams including pumping means and valve means for lowering the lifting levers. No claim is made to the specific type of pumping means disclosed.

The free or outer ends of the lifting levers 29 and 30 are pivotally connected to a bomb elevating scoop shaped member 42, the scoop member comprising a rigid horizontal U-shaped frame, disposed intermediate the lifting levers 29 and 30. The bomb supporting and elevating scoop member is provided with side brackets 43 and 44, secured to the opposite sides of the scoop near the open outer end, these brackets having axially aligned trunnions 43a and 44a, disposed in the journal bearings 45 and 46 at the ends of the lifting arms 29 and 30. The bomb elevating scoop member is preferably formed of sheet metal securely welded together to provide a rigid bomb receiving and supporting structure having a concave bomb supporting interior portion 47 curving upwardly from the edges of the U-shaped central opening, both rearwardly from the opening and towards the sides 48 and 49 of the scoop member, as best seen in Figs. 2, 3 and 4 of the drawing. The scoop member accommodates a large size bomb, such as a 2000 pound aircraft bomb or similar shaped chemical tank as shown in dotted lines at 50 in Fig. 3 of the drawings, the sides of the bomb elevating support or scoop member being provided with spaced vertical sockets 51 to receive a bomb supporting attachment 52, later described in detail, for accommodating a pair of smaller aircraft bombs 53 or smaller chemical tanks as best seen in Fig. 4 of the drawings.

A stabilizing link member 54 is provided, being in the form of a stabilizing yoke, pivotally connected at its front end at 55, to a pair of spaced brackets or ears 56 secured on the L-shaped cross member 5 of the vehicle body. Intermediate the front portion of the stabilizing yoke member is a longitudinally extensible stem portion 57 having a hand wheel 58 with threaded connections 59 to a cross truss member 60. The opposite ends of the cross truss member 60 are formed with rigid parallel arms 61 and 62 extending forwardly below the two lifting levers 29 and 30, the ends of the parallel arms being pivotally connected at 63, 64 to trunnions 65 and 66 rigidly projecting from the opposite sides of the bomb lifting scoop member 42.

The radial distance between the pivotal axis of the lifting levers 29 and 30 and the pivotal axis between the stabilizing yoke 54 and the vehicle support is slightly greater than the radial distance between the pivotal axis of the bomb elevating scoop member 42 and the other ends of the lifting levers and the pivotal axis between the scoop member and ends of the parallel arms of the yoke member and the angular position of the yoke connection 55 with the vehicle support relative to the lifting lever pivot, is in a plane extending approximately 45° downwardly and forwardly of the lifting lever pivot. As the scoop is raised, this produces a slight inclining effect on the scoop and in the lowering action there is a slight leavening effect permitting the scoop to become level or substantially level with the ground in its lowered position and inclined in the raised position.

Rotative adjustment of the hand wheel 58 in one direction or the other lengthens or shortens the stabilizing link yoke member 54 to adjust the inclination of the scoop member 42, particularly while in elevated position as shown in dotted lines in Fig. 2, but as the scoop is lowered to the ground and the link pivotal connection 63 moves toward a plane passing through the pivotal connections at the opposite ends of the lifting levers 29 and 30, the inclination of the bomb elevating scoop is reduced so that it can be easily slipped under a large bomb resting on the ground, with the opposite parallel edges of the U-shaped opening 47 of the scoop disposed below the center of the bomb at opposite sides of a vertical plane passing through the longitudinal axis of the bomb.

Each of the hydraulic pumps 7—8 is of conventional form as shown in Fig. 5, having a manually operable actuating lever 67 for operating hydraulic pumping means to deliver hydraulic pressure fluid through the flexible conduit 40 or 41 to conduit 39 connected to the bottoms of the hydraulic jacks or rams 36—37. A manually operable control valve of conventional form is also provided on each pump having a handle 68 which is manually shiftable to relieve the pressure in the rams 36 and 37 and lower the lifting levers and bomb elevating scoop to the ground as shown in full lines in Fig. 2. The upper ends of the hydraulic cylinders 36—37 beyond the packing (not shown) are each provided with flexible return flow conduits 70 for returning any pressure fluid that escapes past the piston packing members of the rams to the fluid reservoirs in the hydraulic pumping means.

In order to provide easier or faster manipulation of the pumping means, the handle members 67 are extensible to the positions shown in dotted lines at 71, and may be locked in their extended or retracted positions by suitable locking means such as an axially movable locking pin or detent 72.

Spaced, substantially vertical, bracket members 73 are secured to the outside faces of the side frames 2 and 3 of the vehicle body, the upper ends of these brackets being apertured to pivotally receive supplemental supporting arms 74, normally depending downwardly adjacent the outside faces of the side frames. The supporting arms 74 may be swung upwardly over the top edges of the side frames, while the bomb elevating scoop member 43 is in raised position, so as to project in the plane of downward movement of the lifting levers 29 and 30. The lifting levers 29—30 when lowered now rest at their outer portions on the supplemental supporting arms 74, thus supporting the scoop member in a partially elevated position above the ground, removing any supporting strain on the hydraulic elevating mechanism or the lifting lever pivots. With the scoop in this position, the vehicle body can be towed conveniently over comparatively rough ground and positioned below the bomb racks of the aircraft that is to receive the bomb.

When the longitudinal adjustment of the stabilizing link member 54 is made by rotative adjustment of the hand wheel 58, to dispose the bomb on the scoop in the proper inclination after it has been raised to coupling position relative to the bomb racks of an airplane, it is not necessary to disturb this adjustment during the lowering action of the bomb scoop since the angular positions of the pivotal connections of the stabilizing link member relative to the pivotal connections of the lifting levers makes the scoop member substantially self-leavening. Skid members 75 are disposed along the underside of the scoop member to support the scoop on the ground in its fully lowered position.

When it is desired to load and elevate smaller bombs than the one as shown in dotted lines of Fig. 3, the attachment 52 is placed on the scoop member 42. This attachment comprises bomb supporting plates 76 having their opposite end portions curved upwardly as indicated at 77 and formed with downwardly extending post members 78 fitting the sockets 51 previously secured to the side faces of the scoop member. Vertical reinforcing plates 79 extend downwardly from the plates or bars 76 and are secured thereto, the cross bars 79 are in turn secured at their lower edges to the horizontal members 80. Upwardly extending positioning posts 81 are secured to the upper side of the plate 76 for positioning the small bombs on the top of the plate 76 and preventing lateral displacement thereof during the lifting action by the scoop member.

In describing the operation of the device, assuming that an aircraft bomb is lying on the ground, or supported in close proximity to the ground, the scoop is lowered and the vehicle support is manipulated so that it can be slipped under the bomb and one or both of the manual pumping levers 67 are operated to cause expansion of the hydraulic jack members 36 and 37, swinging the lifting levers 29 and 30 upwardly. As the levers 29 and 30 move upwardly, the stabilizing link yoke member 54 maintains the scoop member in substantially level position, increasing in inclination as the scoop is elevated. By manipulation of the hand wheel 58, the final inclination of the scoop may be adjusted or predetermined so that the bombs elevated by the scoop can easily be connected to the bomb racks of the airplane without further manipulation of the hand wheel 58 and the vehicle support can be manipulated to the proper position below the bomb racks by the independent steering action of the front and rear caster wheels 14, 15, 16 and 17. After the bomb has been secured in place on the bomb racks of the airplane, the valve actuating lever 68 is rotated to bypass the hydraulic fluid from the jacks 37 back to the pressure fluid reservoirs in the lower portions of the hydraulic pumping units 7 and 8.

Having thus described my invention, what I claim is new and desire to secure by Letters Patent is:

1. A bomb transporting and elevating truck comprising a vehicle support having a pair of horizontally spaced longitudinal side frames and connecting transverse cross frame means adjacent one end of the side frames to form an unobstructed U-shaped vertical opening between the side frames facing rearwardly, a load lifting lever frame comprising laterally spaced interconnected lifting levers pivotally connected at one end to the cross frame means to swing vertically through the U-shaped opening adjacent the side frames, a bomb receiving carrying and lifting platform disposed between the spaced lifting levers of the lever frame having a vertical unobstructed U-shaped opening therethrough facing in the same direction as the other U-shaped opening and pivotally connected to the outer ends of the lifting levers on aligned pivots, a stabilizing link member pivotally connected at one end to the cross frame means of the vehicle support below, rearwardly, and substantially midway between the pivotal connections of the lifting levers with the vehicle cross frame means and said stabilizing link member having laterally spaced side bars extending rearwardly through the U-shaped opening of the vehicle support below the lifting levers substantially in the plane of movement of the lifting levers and connected to the U-shaped bomb receiving carrying and lifting platform below and rearwardly of the pivotal connection between the bomb lifting platform and the lifting levers, whereby upward swinging movement of the lifting lever frame elevates the bomb lifting platform from a bomb receiving position in the U-shaped opening of the vehicle support to an elevated bomb loading position above the vehicle support with the stabilizing link member stabilizing the bomb lifting platform during vertical swinging movements of the lever frame, and elevating means operable between the transverse cross frame means of the vehicle support and the lifting lever frame, connected to the lifting lever frame intermediate the opposite ends of the lifting levers for swinging the lifting levers and the bomb lifting platform upwardly out of the U-shaped opening and lowering the same from an elevated position through the U-shaped opening.

2. A bomb transporting and elevating truck comprising a vehicle support having spaced longitudinal side frames and a connecting cross frame adjacent one end of the side frames to form a U-shaped opening between the side frames, a load lifting lever frame comprising spaced interconnected lifting levers pivotally connected at one end to the cross frame to swing vertically in said U-shaped opening, a bomb receiving, carrying and lifting platform disposed between the levers of the lever frame and pivotally connected to the opposite ends of the levers on aligned pivots, a link member pivotally connected to the cross frame of the vehicle support below and rearwardly of the pivotal connection of the levers to the vehicle cross frame and extending rearwardly toward the U-shaped opening below and substantially in the plane of movement of the lifting levers and connected to the bomb receiving, carrying and lifting platform below and rearwardly of the pivotal connection between the bomb lifting platform and the lifting levers, whereby upward swinging movement of the lifting lever frame elevates the bomb lifting platform from a bomb receiving position in the U-shaped opening to an elevated bomb loading position above the vehicle support and the stabilizing link member stabilizes the bomb lifting platform during vertical swinging movements of the lever frames, and elevating means between the cross frame of the vehicle support and the lifting lever frame, connected to the lifting lever frame intermediate the ends of the lifting levers for swinging the levers and bomb lifting platform upwardly out of the U-shaped opening and lowering the same from an elevated position through the U-shaped opening in which the axes of the pivotal connections between the vehicle support and the link member and the lifting lever frame are disposed in a plane substantially parallel to the plane passing through the axes of the pivotal connections between the bomb elevating platform and the lifting lever frame and the stabilizing yoke link member when the bomb elevating platform is in the U-shaped opening, and the radial distance between the pivotal axes of the lifting lever frame at the vehicle support and the stabilizing link member pivotal connection at the support is greater than the radial distance between the axes of the pivotal connections of the bomb loading platform with the lifting lever frame and with the stabilizing link member, whereby during elevation of the bomb platform by the lifting lever frame, the stabilizing link member increases the inclination of the bomb loading platform and lowering of the platform decreases this inclination.

3. A bomb transporting and elevating truck comprising a vehicle support having spaced longitudinal side frames and a connecting cross frame adjacent one end of the side frames to form a U-shaped opening between the side frames, a load lifting lever frame comprising spaced interconnected lifting levers pivotally connected at one end to the cross frame to swing vertically in said U-shaped opening, a bomb receiving, carrying and lifting platform disposed between the levers of the lever frame and pivotally connected to the opposite ends of the levers on aligned pivots, a link member pivotally connected to the cross frame of the vehicle support below and rearwardly of the pivotal connection of the levers to the vehicle cross frame and extending rearwardly toward the U-shaped opening below and substantially in the plane of movement of the lifting levers and connected to the bomb receiving, carrying and lifting platform below and rearwardly of the pivotal connection between the bomb lifting platform and the lifting levers, whereby upward swinging movement of the lifting lever frame elevates the bomb lifting platform from a bomb receiving position in the U-shaped opening to an elevated bomb loading position above the vehicle support and the stabilizing link member stabilizes the bomb lifting platform during vertical swinging movements of the lever frames, and elevating means between the cross frame of the vehicle support and the lifting lever frame, connected to the lifting lever frame intermediate the ends of the lifting levers for swinging the levers and bomb lifting platform upwardly out of the U-shaped opening and lowering the same from an elevated position through the U-shaped opening in which the bomb elevating platform comprises a rigid, elongated, U-shaped frame having its opposite sides pivotally connected to the ends of the lifting levers and to the ends of the stabilizing link members, and the interior of the bomb loading platform is curved upwardly from the U-shaped opening in the bomb loading platform in opposite directions toward the sides and closed end to accommodate an aircraft bomb or cylindrical object with the bottom of the bomb located between the adjacent edges of the opening and projecting through the U-shaped opening in the platform below the bottom of the platform, whereby the vehicle support may be manipulated with the bomb elevating platform in its lowered position to slip the opposite edge portions of the U-shaped opening of the bomb elevation platform longitudinally under a bomb below the widest horizontal diameter thereof while the bomb is lying on the ground and the bomb may be elevated directly to aircraft loading position by raising the platform to a predetermined loading position.

4. A bomb transporting and elevating truck comprising a vehicle support having spaced longitudinal side frames and a connecting cross frame adjacent one end of the side frames to form a U-shaped opening between the side frames, a load lifting lever frame comprising spaced interconnected lifting levers pivotally connected at one end to the cross frame to swing vertically in said U-shaped opening, a bomb receiving, carrying and lifting platform disposed between the levers of the lever frame and pivotally connected to the opposite ends of the levers on aligned pivots, a link member pivotally connected to the cross frame of the vehicle support below and rearwardly of the pivotal connection of the levers to the vehicle cross frame and extending rearwardly toward the U-shaped opening below and substantially in the plane of movement of the lifting levers and connected to the bomb receiving, carrying and lifting platform below and rearwardly of the pivotal connection between the bomb lifting platform and the lifting levers, whereby upward swinging movement of the lifting lever frame elevates the bomb lifting platform from a bomb receiving position in the U-shaped opening to an elevated bomb loading position above the vehicle support and the stabilizing link member stabilizes the bomb lifting platform during vertical swinging movements of the lever frames, and elevating means between the cross frame of the vehicle support and the lifting lever frame, connected to the lifting lever frame intermediate the ends of the lifting levers for swinging the levers and bomb lifting platform upwardly out of the U-shaped opening and lowering the same from an elevated position through the U-shaped opening including caster wheels under the side frames at the closed end of the vehicle support, a pivoted towing tongue connected to the support, linkage means between the tongue and caster wheels for steering the wheels by horizontal swinging movements of the tongue, caster wheels at the opposite ends of the side frames, a steering link connection between the last-mentioned caster wheels, and locking means between the side frames of the support and last-mentioned caster wheels for fixing the same for rotation in planes parallel to the side frames.

5. A bomb transporting and elevating truck comprising a vehicle support having spaced longitudinal side frames and a connecting cross frame adjacent one end of the side frames to form a U-shaped opening between the side frames, a load lifting lever frame comprising spaced interconnected lifting levers pivotally connected at one end to the cross frame to swing vertically in said U-shaped opening, a bomb receiving, carrying and lifting platform disposed between the levers of the lever frame and pivotally connected to the opposite ends of the levers on aligned pivots, a link member pivotally connected to the cross frame of the vehicle support below and rearwardly of the pivotal connection of the levers to the vehicle cross frame and extending rearwardly toward the U-shaped opening below and substantially in the plane of movement of the lifting levers and connected to the bomb receiving, carrying and lifting platform below and rearwardly of the pivotal connection between the bomb lifting platform and the lifting levers, whereby upward swinging movement of the lifting lever frame elevates the bomb lifting platform from a bomb receiving position in the U-shaped opening to an elevated bomb loading position above the vehicle support and the stabilizing link member stabilizes the bomb lifting platform during vertical swinging movements of the lever frames, and elevating means between the cross frame of the vehicle support and the lifting lever frame, connected to the lifting lever frame intermediate the ends of the lifting levers for swinging the levers and bomb lifting platform upwardly out of the U-shaped opening and lowering the same from an elevated position through the U-shaped opening including supplemental lifting frame supporting means comprising a pair of elongated supplemental supporting arms movably connected to the side frames of the vehicle support at opposite sides of the U-shaped opening constructed and arranged to be disposed in projected position toward each other from the side frames in the path of lowering movement of the lifting levers, whereby the lifting levers may be elevated and the supporting arms moved into the plane of movement of the lifting levers and upon lowering of the lifting levers, the supporting arms will support the lifting levers and bomb platform independently of the lifting lever elevating means.

6. In an aircraft bomb loading apparatus, a dirigible support adapted to move over the ground having an unobstructed substantially U-shaped vertical opening in the rear end thereof, a pair of lifting levers pivoted to the support adjacent the opposite sides of the U-shaped opening at the closed end of the U-shaped opening for vertical swinging movement through the U-shaped opening adjacent the sides of the U-shaped opening, extensible jack members between and adjacent to the two lifting levers each connected to the support at the closed end of the U-shaped opening below and rearwardly of the lifting lever connections to the support, and connected to the lifting levers at points between to the lifting lever fulcrum connections to the support and their free ends, for swinging the lifting levers upwardly out of the U-shaped opening and lowering the same through the opening, a bomb supporting and elevating scoop member located between the lifting levers and pivoted to the free ends of the lifting levers having a rearwardly extending U-shaped bomb receiving unobstructed opening extending vertically therethrough, stabilizing link means pivotally connected at one end to the support below the lifting lever connection to the support and extending into the U-shaped vertical opening in the support, and pivotally connected to the bomb elevating scoop member at the opposite sides of the bomb elevating scoop member between same and the rear end of the scoop member.

7. A bomb elevating device for elevating a bomb to a loading position in the bomb racks of an airplane comprising a dirigible support having a rigid frame formed with a central, U-shaped opening extending into the rear end of the support and vertically through the support, spaced lifting levers pivotally connected to the support in advance of the closed end of the U-shaped opening for vertical swinging movements at opposite sides of the opening, means between the support and the lifting levers for swinging the free ends of the levers upwardly out of the U-shaped opening and lowering the levers into the opening, an elongated U-shaped bomb supporting and elevating member pivotally connected at its opposite sides to the free ends of the lifting levers having a concave bomb receiving and supporting surface formed with a longitudinally extending U-shaped opening in its rear edge and passing vertically therethrough, substantially parallel stabilizing linkage means pivotally connected at one end to the support below and rearwardly of the lifting lever connection to the support and pivotally connected at the other end to the bomb supporting and elevating member at opposite sides thereof at points rearwardly of and below the lifting lever connections to the bomb elevating member, and adjusting means in said stabilizing linkage means for adjusting the length thereof to adjust the inclination of the bomb elevating member about its pivotal connections on the lifting levers to predetermine the inclination of the bomb elevating member in a vertical plane when in raised elevated position.

8. In a bomb transporting and elevating apparatus, a dirigible support comprising a rigid frame having spaced parallel side members closed at one end to form a vertical rearwardly extending U-shaped opening therebetween in the front end of the support, caster wheels at the rear ends of said side members, a steering tongue pivoted to the frame intermediate the side members at the closed end of the U-shaped opening, steering linkage connections between the caster wheels and the steering tongue, independent caster wheels disposed under the opposite ends of the side members at opposite sides of the U-shaped opening, a steering connection between the last-mentioned caster wheels, releasable locking means on the side members for locking the caster wheels for rotation in parallel relation to the side member, a pair of lifting levers extending rearwardly into the U-shaped opening adjacent the side members with their inner ends pivotally connected to the support at the closed end of the U-shaped opening, hydraulic lifting jack members pivoted at their lower ends to the support adjacent the side members at points below and rearwardly of the lifting lever connections to the support and connected to the lifting levers intermediate the opposite ends of the levers, hydraulic pump means on the support having connections for introducing hydraulic pressure fluid into the hydraulic jack means to extend the same and swing the free ends of the lifting levers upwardly out of the U-shaped opening including hydraulic pressure release means to lower the levers into the opening, a bomb elevating cradle comprising an elongated rigid U-shaped frame disposed between the lifting levers with the opposite sides of the frame pivoted to the free ends of the lifting levers adjacent the rear ends of the side frames of the support when the lifting levers are lowered in the U-shaped opening, said cradle having the U-shaped central longitudinal opening extending rearwardly thereinto, having a bomb supporting surface curved upwardly from the U-shaped opening to the sides of the frame to accommodate a bomb or cylindrical object when placed longitudinally thereon with the bottom portion of the bomb or object extending through and below the U-shaped opening of the cradle whereby the bomb or cylindrical object when resting on the ground may be disposed for lifting movement in the cradle by advancing the support to move the cradle longitudinally under the bomb to receive the bomb or object therein with the opposite edges of the longitudinal U-shaped cradle opening disposed below the center of the bomb or object, so that the same can be lifted directly from the ground by vertical swinging movement of the lifting levers, and adjustable substantially parallel stabilizing link means connected between the support and the cradle for determining the inclination of the cradle when in raised position and stabilizing the same in substantially parallel positions during the lowering movement thereof to the ground.

WARREN W. RYAN.

REFERENCES CITED

The following references are of record in the file of this patent:

UNITED STATES PATENTS

| Number | Name | Date |
|---|---|---|
| 1,514,769 | Johnston et al. | Nov. 11, 1924 |
| 1,527,251 | Furst | Feb. 24, 1925 |
| 2,189,010 | Lewis | Feb. 6, 1940 |
| 2,240,723 | Stoehr | May 6, 1941 |
| 2,309,730 | Hastings, Jr. | Feb. 2, 1943 |
| 2,379,094 | Maxon, Jr. | June 26, 1945 |

FOREIGN PATENTS

| Number | Country | Date |
|---|---|---|
| 649,176 | Germany | Aug. 17, 1937 |

OTHER REFERENCES

Ser. No. 340,618, Magni et al. (A. P. C.), pub. May 4, 1943.